United States Patent [19]
Quinif

[11] Patent Number: 5,875,608
[45] Date of Patent: Mar. 2, 1999

[54] EXPANDABLE SPACER CORES FOR FLUSH DOORS AND THE METHOD OF MAKING SAME

[76] Inventor: Edward G. Quinif, 6237 Sage Dr., Scottsdale, Ariz. 85253

[21] Appl. No.: 818,856

[22] Filed: Mar. 17, 1997

[51] Int. Cl.[6] .............................. E04C 2/36; E06B 3/74; B32B 3/12
[52] U.S. Cl. ..................... 52/784.14; 52/456; 52/793.1; 428/116
[58] Field of Search ..................... 52/456, 457, 784.14, 52/784.15, 793.1, 794.1; 428/116

[56] References Cited

U.S. PATENT DOCUMENTS

| | | | |
|---|---|---|---|
| 2,511,620 | 6/1950 | Clements | 52/784.14 X |
| 2,809,403 | 10/1957 | Clements | 52/784.14 X |
| 3,385,002 | 5/1968 | Quinif | 52/784.14 X |
| 4,583,338 | 4/1986 | Sewell et al. | 52/784.14 X |
| 5,167,105 | 12/1992 | Isban et al. | 52/784.15 X |
| 5,573,818 | 11/1996 | Haywood et al. | 52/793.1 X |
| 5,789,059 | 8/1998 | Nomoto | 428/116 |
| 5,792,541 | 8/1998 | Herrera | 428/116 |

*Primary Examiner*—Christopher Kent
*Assistant Examiner*—Timothy B. Kang
*Attorney, Agent, or Firm*—Dykema Gossett PLLC

[57] ABSTRACT

A door has a pair of outer skins separated by a frame to form a hollow space therebetween. An expandable spacer core is connected between the pair of skins. The expandable spacer core has a plurality of elongated members each oriented perpendicular to both outer skins. A plurality of expandable core liners extend between elongated members to position the elongated members with respect to each other and to the outer skin. The expandable spacer cores are formed by gluing strips of expandable core liners between corrugated layers so that the corrugated layers are held together by the expandable core liners. The corrugated layers are cut in a direction across the expandable core liners. Once the expandable spacer cores are formed, an adhesive is placed on the edges of the expandable spacer core and the expandable spacer core is affixed to the inner side of the outer skins of the door.

10 Claims, 2 Drawing Sheets

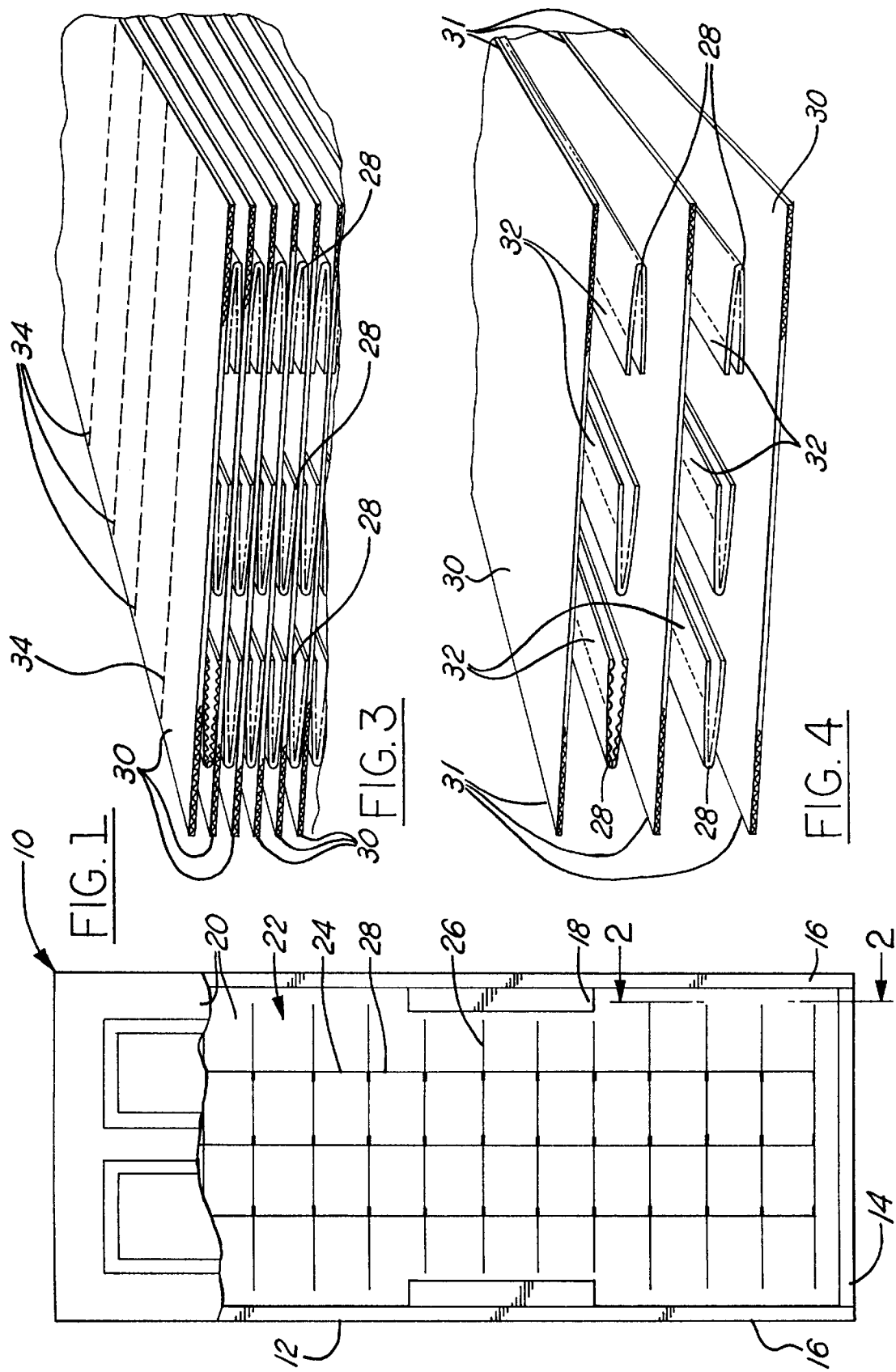

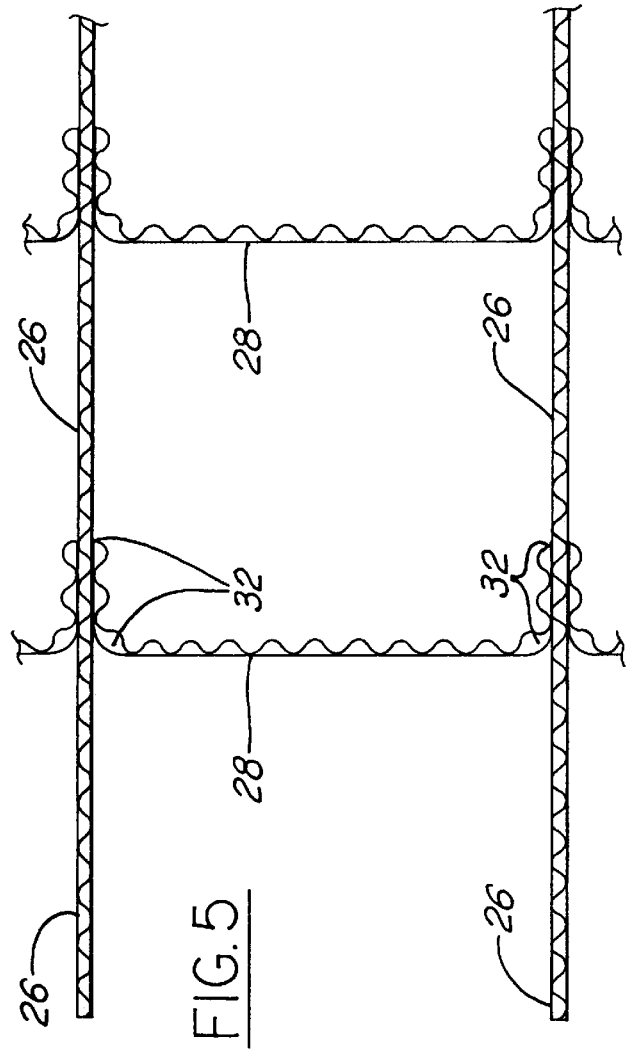
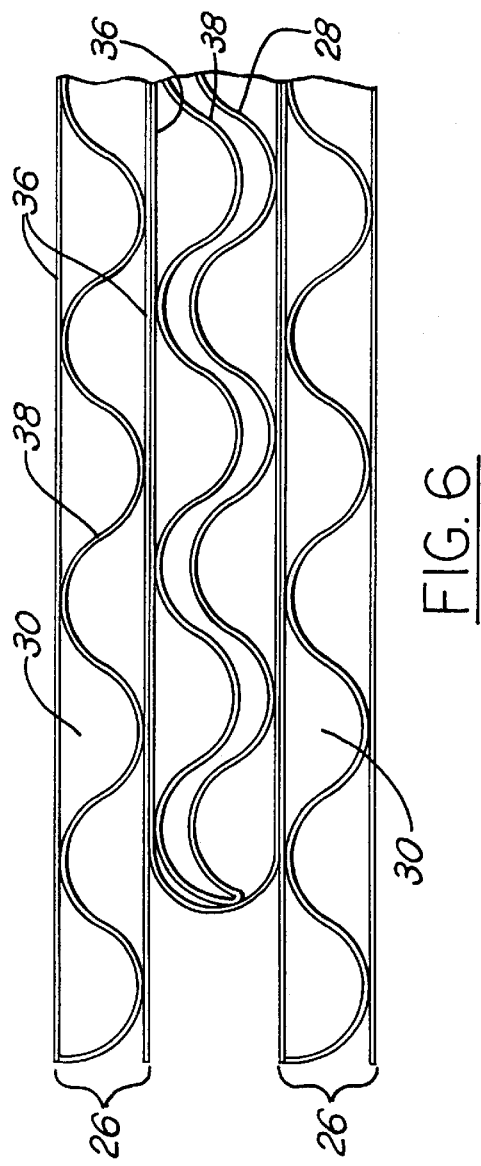
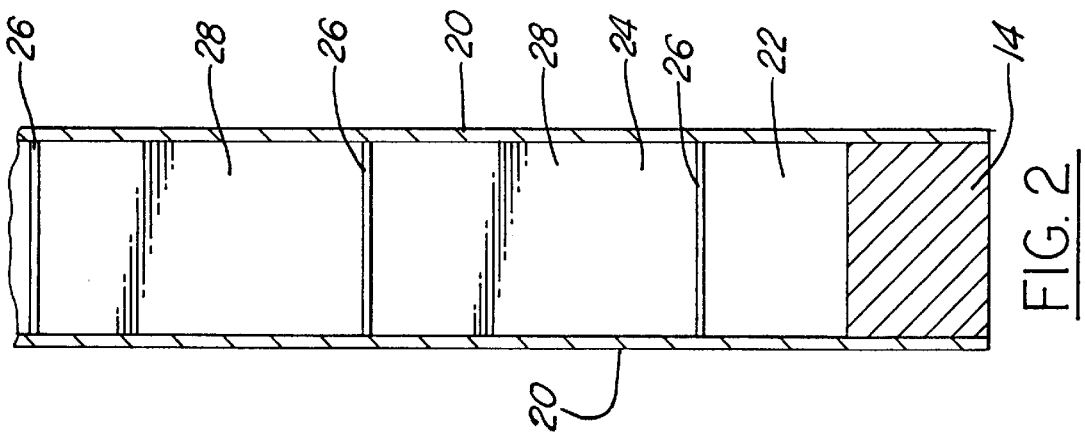

EXPANDABLE SPACER CORES FOR FLUSH DOORS AND THE METHOD OF MAKING SAME

BACKGROUND OF THE INVENTION

The present invention relates generally to hollow doors and more specifically to a core structure inserted within a hollow door to provide support for the skins of the door.

Hollow core doors are commonly used in many types of buildings. The common structure of a hollow core door includes a pair of door skins which are separated by a wood frame. The wood frame has vertical wood stiles joined to upper and lower horizontal wood rails. The wood stiles and rails form the edges of the door. A lock block may also be included in the area of the door where locks and handles are attached. The lock block provides the additional support that is needed to secure a lock in the door. A hollow area is enclosed between the two door skins and within the frame. The hollow area typically requires some type of structural reinforcement.

One type of reinforcement commonly used in hollow core doors is a honeycomb core structure that is glued in place between the door skins. The honeycomb core structure may be, for example, corrugated board. The honeycomb structure is supplied in an unexpanded manner. The honeycomb core is stretched across the skin of the interior of the door. One problem with using such a honeycomb core structure is that it is difficult to stretch to achieve an even honeycomb pattern within the door. Commonly, the honeycomb core must be overstretched and then manipulated into place. This process is labor intensive and thus not a cost effective manner for manufacturing the door.

The honeycomb core fully extends between the horizontal rails and vertical stiles to completely fill the hollow interior. Consequently, more core material is inserted within the interior of the door than is actually required for support. The extra core material increases the cost of the door.

Another type of door reinforcement includes solid blocks placed strategically between the door skins. The solid blocks are commonly formed of laminated strips of corrugated material or from pieces of Styrofoam. One disadvantage of solid block is that they use a large quantity of material making them more expensive. Also, these solid blocks require a significant amount of glue to be spread over their entire surface to bond to the outer skins of the door.

It is therefore desirable to provide a structural core or support for a hollow core door which is cost effective by being easy to manufacture and by using a reduced amount of material.

SUMMARY OF THE INVENTION

It is therefore an object of the invention to provide an improved construction for a hollow panel door including an improved support structure for the door skins.

In accordance with one aspect of the invention, a door is provided that has a pair of outer skins separated by a frame to form a hollow space therebetween. An expandable spacer core is connected between the pair of skins. The expandable spacer core has a plurality of elongated members each oriented perpendicular to the first outer skin and to the second outer skin. A plurality of expandable core liners extend between the elongated members to position the elongated members. The connectors orient the elongated members with respect to the first and second outer skins to hold elongated members upright.

In accordance with another aspect of the invention, a method for forming a door includes applying adhesive to an adhesive region of a plurality of strips of foldable material, arranging a plurality of strips of foldable material between a plurality of corrugated layers, cutting through the plurality of corrugated layers and across the foldable material to form an expandable spacer core held together by the foldable material, and affixing the expandable spacer core between a pair of outer door skins.

In forming the door, an adhesive is applied to the edges of the expandable spacer core. The expandable spacer core is expanded and placed on the hollow space side of an outer skin. The framing of the door may also be connected to the hollow space side of an outer skin. The second outer skin is then placed on top of the frame and expandable spacer core to form the door.

It is another advantage of the invention that the corrugated spacers are easily expanded to the proper size and placed within the hollow space within the door thus resulting in relatively less manufacturing time.

BRIEF DESCRIPTION OF THE DRAWINGS

Other features and advantages of the present invention will become apparent from the following detailed description which should be read in conjunction with the drawings in which:

FIG. 1 is a cut-away view of an interior portion of a hollow core door;

FIG. 2 is cross-sectional view along line 2—2 of a rigid spacer inserted within the hollow space within a door;

FIG. 3 is an exploded perspective view of a first set of corrugated layers coupled by expandable core liners;

FIG. 4 is a perspective view of the first set of corrugated layers before being cut to form the expandable spacer core;

FIG. 5 is an enlarged cross-sectional view showing the interlocking expandable spacer core; and FIG. 6 is a partial side view of a portion of the expandable spacer core.

DETAILED DESCRIPTION OF THE PREFERRED EMBODIMENT

Referring now to the drawings like reference numerals are used to identify identical components in the various views. Although the invention will be illustrated in the context of a flush panel hollow core door, it will be appreciated that this invention may be used with other hollow core door applications.

Referring now to FIG. 1, a hollow core door 10 has a rectangular frame 12 around its perimeter. Frame 12 comprises upper and lower horizontal rails or rail members 14 and vertical or side stiles or stile members 16. In the preferred embodiment horizontal rails 14 and vertical stiles 16 are formed of solid wood material. Lock or mounting blocks 18 may also be part of the supporting structure of door 10. Lock blocks 18 are used at the locations in which the door handle and locks may be fastened as shown in FIG. 1.

Door 10 has a pair of outer skins, sheets or panels 20, one of which has been removed to reveal the inner structure of door 10. Outer skins 20 are preferably smooth on the interior of the door, i.e., planar as in a flush-type door. Hollow space 22 is the space between frame 12 and outer skins 20.

To provide structural rigidity and to hold the outer skins 20 apart, an expandable spacer core 24 is affixed between outer door skins 20. Expandable spacer core 24 has a number of elongated members 26 that are preferably perpendicular to the plane of outer skins 20. Because the area adjacent to the lock block 18 is not as wide, the elongated members 26 may be reduced or bent in areas adjacent to lock block 18. Expandable spacer core 24 also has a plurality of expandable core liners 28 that are also preferably perpendicular to the plane of outer skins 20 and when fully stretched perpendicular to elongated members 26. Expandable core liners 28 are used to hold elongated members 26 substantially perpendicular to outer door skins 20 during assembly. In the preferred embodiment, elongated members 26 are formed of a rigid two-face corrugated board. Expandable core liners 28 are preferable formed of a single face corrugated material. Single face corrugated material may be easily folded.

Referring now to FIG. 2, a cross-sectional view of a hollow core 22 is shown. Expandable spacer core 24 is shown with its elongated members 26 and expandable core liners 28 supporting outer skins 20. Horizontal rails 14 support the edges of the outer skins 20.

Referring now to FIG. 3, expandable core liners 28 are shown in their relative positions to corrugated layers 30. Only three corrugated layers 30 are illustrated. In one constructed embodiment, fourteen corrugated layers 30 were used. Expandable core liners 28 are foldable pieces of corrugated or paper material. Expandable core liners 28 are preferably placed parallel to each other and parallel to two edges 31 of corrugated layers 30. For a common door width, two or three expandable core liners 28 may be used across the width of corrugated layers 30. Each of corrugated layers 30 are connected to the adjacent layer by expandable core liners 28. An adhesive region 32 that extends along the elongated edges of expandable core liners 28. Adhesive region 32 is the area on expandable core liners 28 to which adhesive is applied. Adhesive may be applied to the adhesive region 32 prior to joining the corrugated layers 30 together. Each expandable core liner 28 has two adhesive regions 32. Adhesive regions 32 are on opposite elongated edges of expandable core liners 28. The adhesive used must be capable of bonding expandable core liners 28 and corrugated layers 30. To expedite manufacturing, preferably the adhesive is fast setting.

Referring now to FIG. 4, expandable core liners 28 are shown affixed to corrugated layers 30. Corrugated layers 30 are cut along cut lines 34 to form expandable spacer core 24. Cut lines 34 run in a direction across expandable core liners 28 so that after cutting, expandable core liners 28 hold together the strips of corrugated layers 30. Once cut, the strips of corrugated layers 30 form elongated members 26. A rip saw may be used to cut corrugated layers 30.

Referring now to FIG. 6, a cross-sectional view of a portion of expandable core liner 28 between elongated members 26 is shown. Elongated members 26 are formed of a pair of outside layers 36 and a corrugated layer 38. Elongated members 26 are two-face in the sense that two outside layers 36 are used to form them. The two-face material has a single corrugated layer 38. Expandable core liner 28 is formed of a single face having a single outside layer 36 and a single corrugated layer 38. During cutting of the corrugated layers 30, along cut lines as shown as 34 in FIG. 3, the rip saw provides a large force. The large force has a tendency to skew corrugated layers 30 with respect to each other. To alleviate this problem, it is preferred that the corrugated layer 38 of expandable core liners 28 are aligned to correspond so that the corrugated layer 38 fits into itself when the expandable core liners 28 are folded between corrugated layers 30. The interlocking of corrugated layer 38 helps corrugated layers 30 remain aligned during the cutting process. Another advantage of having the corrugated layers 38 of expandable core liners align are that if the expandable spacer cores 24 are to be shipped, the interlocking corrugated layers 38 help prevent corrugated layers 30 from becoming misaligned.

Referring now to FIG. 5, elongated members 26 are shown spaced apart by expandable core liners 28. When inserted within the hollow core of the door, expandable core liners 28 may be taut as shown in FIG. 5. Expandable core liners 28, however, need not be pulled taut.

During assembly of the door, expandable spacer core 24 is manufactured as described above. Expandable spacer core 24 may be manufactured at a separate location and brought to the assembly line where the doors are manufactured. A door skin 20 is typically placed in a horizontal position. Frame 12 and lock blocks 18 may then be connected to outer skin 20. Adhesive is then applied to the edges of the expandable spacer core 24. This may occur using a double sided glue spreader common in the industry. This may however occur one edge at a time. Expandable spacer core 24 is then expanded within hollow space 22. Expandable core liners 28 hold elongated members 26 in a direction perpendicular to the plane of outer skin 20. If adhesive has not been applied to the second side of expandable spacer core 24, adhesive may then be applied. The outer skin 20 is placed so that contact is made with frame 12 and expandable spacer core 24. Once the adhesive is set, the door 10 has been formed.

While the best mode for carrying out the present invention has been described in detail, those familiar with the art to which this invention relates will recognize various alternative designs and embodiments for practicing the invention as defined by the following claims:

What is claimed is:

1. A hollow core door comprising:
   a rectangular frame, including a pair of side stiles parallel to each other, and upper and lower rails also parallel to each other, all of said stiles and rails being of substantially the same predetermined thickness, having their end faces lying in parallel planes, and being joined respectively at the frame corners;
   an expandable structural spacer core disposed within said frame and having front and back surfaces lying in said parallel planes, said spacer core having a plurality of spaced apart elongated members which are generally parallel to one another and a plurality of expandable core liners extending between said elongated members;
   a first outer skin and a second outer skin secured to opposite sides of said frame and to the front and back surfaces of said expandable spacer core, said expandable spacer core holding said first and second skins a predetermined distance apart;
   said elongated members being located between and arranged generally perpendicular to said stiles;
   said expandable core liners holding said elongated members substantially perpendicular to said outer skins during assembly;
   each of said expandable core liners being foldable generally in the middle thereof and having a pair of end portions provided with glue for securing same to a pair of adjacent elongated members;
   said expandable core liners being arranged lengthwise in end to end relationship in a plurality of rows which are spaced apart; and each of said expandable core liners when fully stretched being arranged generally perpendicular to the pair of elongated members to which it is attached.

2. A door as recited in claim 1 wherein said elongated members extend laterally across a width of said door.

3. A door as recited in claim 1, wherein said expandable core liners are formed of a single face corrugated material.

4. A door as recited in claim 1, wherein said expandable spacer core when unexpanded interlocks upon itself.

5. A door as recited in claim 1, wherein said elongated members are formed of a two-face corrugated board material.

6. A hollow core door comprising:

a rectangular frame, including a pair of side stiles parallel to each other, and upper and lower rails also parallel to each other, all of said stiles and rails being of substantially the same predetermined thickness, having their end faces lying in parallel planes, and being joined respectively at the frame corners;

an expandable structural spacer core disposed within said frame and having front and back surfaces lying in said parallel planes, said spacer core having a plurality of spaced apart elongated members which are generally parallel to one another and a plurality of expandable core liners extending between said elongated members;

a first outer skin and a second outer skin secured to opposite sides of said frame and to the front and back surfaces of said expandable spacer core, said expandable spacer core holding said first and second skins a predetermined distance apart;

said elongated members being located between and arranged generally perpendicular to said stiles;

said elongated members being made from a two-face corrugated board material;

said expandable core liners holding said elongated members substantially perpendicular to said outer skins during assembly;

said expandable core liners being made from a single face corrugated material;

each of said expandable core liners being foldable generally in the middle thereof and having a pair of end portions provided with glue for securing same to a pair of adjacent elongated members;

said expandable core liners being arranged lengthwise in end to end relationship in a plurality of rows which are spaced apart; and each of said expandable core liners when fully stretched being arranged generally perpendicular to the pair of elongated members to which it is attached.

7. The hollow core door defined in claim 6 wherein there are a pair of mounting blocks extending inwardly from a portion of each of said stiles, any elongated member located between said mounting blocks having a reduced length to accommodate said mounting blocks.

8. The hollow core door defined in claim 6 wherein said expandable core liners are arranged in three rows, with one row in the center of the door and the other rows on opposite sides of the center row, said other rows being spaced from the ends of the elongated members.

9. The hollow core door defined in claim 6 wherein said expandable spacer core having a generally uniform thickness throughout the length and width thereof equal to the thickness of said frame.

10. The hollow core door defined in claim 6 wherein said spacer core has a collapsed form and an expanded form which permits expansion of the spacer core from its collapsed form into its expanded form in the longitudinal direction of said frame, with said spacer core extending from adjacent one end of said frame to adjacent an opposite end of said frame.

* * * * *